United States Patent
Karr

[15] 3,672,262
[45] June 27, 1972

[54] VALVE OPERATOR APPARATUS

[72] Inventor: Michael A. Karr, 9353 Rosstown Way, Houston, Tex. 77055

[22] Filed: May 4, 1970

[21] Appl. No.: 34,153

[52] U.S. Cl.................................................92/140, 74/104
[51] Int. Cl.......................................F01b 9/00, F16h 21/54
[58] Field of Search................92/138, 140; 251/58; 74/104, 74/89.15, 504

[56] References Cited

UNITED STATES PATENTS

| | | | |
|---|---|---|---|
| 3,385,120 | 5/1968 | Nott | 74/89.15 |
| 2,953,344 | 9/1960 | Yancey | 251/58 |
| 3,056,573 | 10/1962 | Matheson et al. | 251/58 |
| 3,298,286 | 1/1967 | Tyler | 92/140 |
| 3,104,592 | 9/1963 | Sheesley | 92/140 |

*Primary Examiner*—Everette A. Powell, Jr.
*Assistant Examiner*—A. M. Zupcic
*Attorney*—Donald Gunn

[57] ABSTRACT

A pressure responsive valve operator which rotates a valve stem and which includes a piston connected with a piston rod. The piston rod carries a pin at its free end which is connected to a pair of yoke members on opposite sides of the piston rod. The connection is made by the use of sliding blocks in slots in the yoke members. Lateral forces on the piston rod are avoided by extending the ends of the connective pin into slots of a surrounding housing, there being sliding blocks in those slots which take up the lateral forces on the piston rod. The avoidance of lateral loading on the piston rod materially reduces the expense of the equipment in the elimination of oil seals, bearings, and the like.

3 Claims, 2 Drawing Figures

PATENTED JUN 27 1972 3,672,262
FIG. 1
FIG. 2
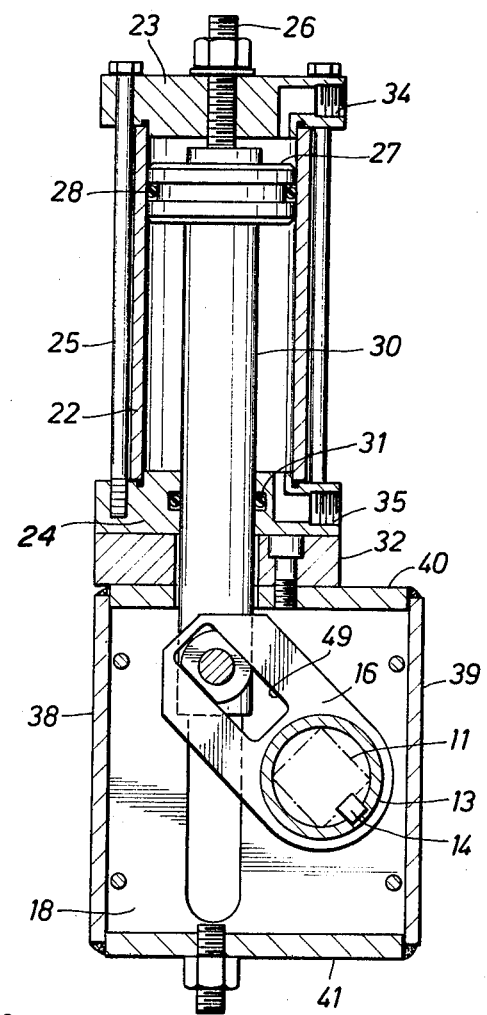
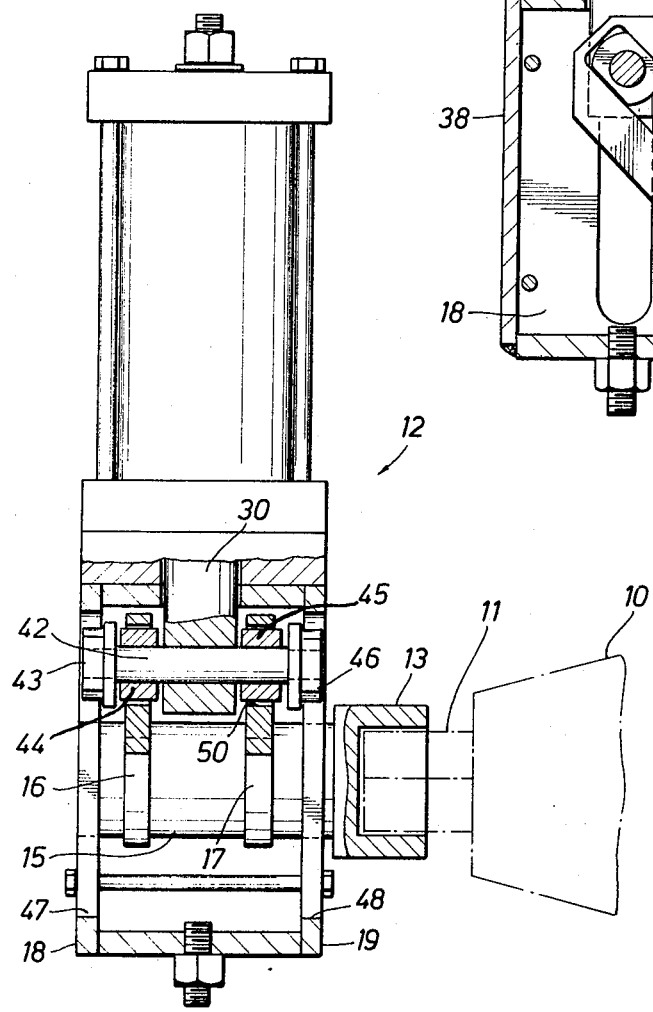
Michael A. Karr
INVENTOR
BY Donald Gunn
ATTORNEY

VALVE OPERATOR APPARATUS

RELATED APPLICATIONS

Applicant has no presently pending related applications.

SUMMARY OF PROBLEM AND SOLUTION

Remote operation of valves in petrochemical plants and the like is customarily required. Quite often, the valves are extremely large, such as might be found in a 48 inch pipe. The valves are normally equipped with a stem which rotates the valve plug or ball to open the valve from a fully closed position to a fully open position. Customarily, about 90° of rotation of the present invention provide a valve operator mechanism which that is required to operate the valve adequately.

Valve operators have been supplied heretofore for manipulation of the valve stem. It is customary to connect the valve operator to the valve stem and rotate the stem in response to a remote signal.

Valve operators of the prior art may be generally characterized in the following specifics. They generally include some sort of hydraulic responsive equipment, typically a piston in a cylinder with the piston rod being connected by means of an eccentric or the like for rotation of the stem. The forces required to open large valves are quite excessive, and hence, the forces in the valve operator are quite large. Because the forces are large, the stresses in the valve operator are quite significant and expensive equipment is required to avoid wear or damage to the equipment. Such equipment as extra large bearings, oil seals, polished piston rod guides, and the like, have been implemented to prevent leakage along the piston rod and to keep it stiff and straight. As will be appreciated without undue elaboration, flexure of a piston rod wrecks havoc with the associated equipment. With the foregoing in view, it will be understood how valve operators in the past have been quite expensive, built of heavy gauge material, equipped with extra protective bearings and other paraphernalia for the purpose of maintaining the piston rod stiff and straight, and have been otherwise unsatisfactory.

By way of contrast, attention is directed to the present invention. The present invention provides a measurable improvement over valve operators in the prior art. The present invention is cooperative with a valve operator which is comprised of a piston within a cylinder and connected to a piston rod. The rod is connected to an eccentric or other mechanism for converting the linear motion into rotary motion which turns the stem of the valve. More specifically, the present invention provides an improvement in that the piston rod is connected by a pin to a pair of yoke members which bracket the piston rod for transferring motion to the valve stem. The connection is made through the use of a pair of slots, one in each of the two yoke members. The connective pin which passes through the slots does not contact the slots of the yoke members themselves, but rather, sliding pillow blocks which provide a zone of contact against the side walls of the slots are utilized. Additionally, the pin extends through the slots and beyond the yoke members. The opposite ends of the pin in the piston rod are received within additional slots in a housing, the slots being parallel to and coincident with the path of the piston rod. Again, the pin itself does not contact the side wall or edges of the slots, but rather, sliding pillow blocks are incorporated to achieve this purpose. More particularly, the slots in the surrounding housing take all lateral forces of the piston rod and prevent its lateral loading. Hence, the piston rod is loaded axially only, and because of this, substantial economies in the construction and fabrication of the valve operator may be achieved.

Many other objects and advantages of the present invention will become more readily apparent from a consideration of the specification and included drawings, wherein:

FIG. 1 is a side sectional view of the valve operator constructed in accordance with the teachings of the present invention; and, FIG. 2 is a view, partly in section, taken through the tip of the piston rod, connected pin, yoke members, and support housing to show the alignment of and lateral support of the arrangement of the present invention.

In the drawings, attention is first directed to FIG. 2 which illustrates a valve 10 in dotted line. The valve 10 is equipped with a stem 11. The valve operator of the present invention is indicated by the numeral 12. The valve operator 12 serves the general purpose of rotating the stem 11 with respect to the valve 10 to either open or close the valve member in the valve. As mentioned before, the typical valve requires about 90° rotation to travel from a fully open to a fully closed position. The valve operator of the present invention is particularly adapted for this purpose.

It is appropriate to consider the invention in greater detail. For this purpose, attention is directed to FIG. 1 of the drawings. In FIG. 1, the valve stem 11 is indicated in dotted line, and it will be noted that a surrounding coupling sleeve 13 is fitted about the stem 11. A key 14 is wedged between the stem 11 and the coupling 13 to rigidly fix the eccentric means as will be described hereinafter to the stem itself. The coupling member 13 is shown in side view in FIG. 2, and it will be noted that it is connected to a large wrist pin 15 within the valve operator 12. The wrist pin is joined to the coupling 13, and is also joined to a pair of yoke members 16 and 17. The yoke members 16 and 17 are preferably similar to one another, the only differences being the spacing from one another so as to be positioned on opposite sides of the piston rod as will be described. They are preferably formed of symmetrical stock and are welded or otherwise joined to the wrist pin 15.

It will be understood that the coupling 13, pin 15, and yoke members 16 and 17 rotate together as a unit. The wrist pin 15 is supported by bearings or other appropriate journaled openings in the side wall 18 and 19 which comprise a portion of the housing of the valve operator 12. The bearings or journaled openings define a suitable axis of rotation for all of the joined equipment as was mentioned.

It will be appropriate to next consider the piston and cylinder arrangement of the valve operator 12. In FIG. 1, the numeral 22 identifies a cylindrical wall which terminates in a cylinder head 23 at its upper end, and a lower cylinder head 24 at the opposite end. The heads 23 and 24 are pulled together by long bolts 25 spaced about the cylinder 22. The bolts pull the heads 23 and 24 snugly against the cylinder 22 so as to form a leak-proof connection therewith, and for this purpose, additional seal members are located in the heads 23 and 24 as shown in FIG. 1.

A threaded stop member 26 is located in the upper head 23. A piston 27 is slidable within the cylinder 22. A seal member 28 fully surrounds the piston and is in peripheral contact with the cylinder wall to prevent leakage past the piston 27. The upper extremity of travel of the piston 27 is determined by the stop member 26 which is locked in a desired position defining one extremity of movement of the operator.

The lower head 24 fully surrounds a piston rod 30 which is joined to the piston 27. The rod passes through the lower head 24. Fluid communicantion along the length of the rod 30 is prevented by a seal member located at 31 recessed within the head 24. The head 24 is received on the upper portions of a support member 32 which is bolted or otherwise joined to a housing which encloses the pin 15 and the associated rotative apparatus. More particularly, the piston rod 30 extends into the housing for interconnection with the rotative apparatus as will be described.

As partly described above, the piston 27 is a double acting piston which is exposed to pressure fluid on both faces. The upper head 23 incorporates a tapped opening 34 for admitting pressure fluid to the upper face of the piston 27. In addition, the lower head 24 is tapped at 35 to admit pressure to the opposite face of the piston. The valve operator of the present invention is adapted to be used in a cooperative manner with a source of pressure fluid which is selectively and controllably supplied to the inlets 34 and 35 of the double acting piston and cylinder arrangement. As will be recognized, the piston is driven and the piston rod 30 moves with it.

The connective plate 32 is bolted or otherwise joined to a rectangular box-like structure. The box-like structure includes the facing walls 18 and 19 as previously described with respect to FIG. 2. Additionally, walls 38 and 39 are perpendicular to the walls 18 and 19 and intersect them. The end walls 40 and 41 further define the rectangular box-like structure for receiving the piston rod and rotative apparatus connected to it.

It should be noted that the box-like structure is preferably received within a sealed atmosphere including at least a splash or spray lubrication system. It is not essential to maintain a closed lubricating system, but it is helpful to prevent excessive wear on the equipment. However, this is omitted from the drawings for the sake of clarity in setting forth the present invention.

The lower end of the piston rod 30 is joined to a pin 42. The pin 42 supports four sliding pillow blocks which are indicated by the numerals 43, 44, 45, and 46. The pillow blocks 43 and 46 are received within slots in the side plates 18 and 19 which are identified by the numerals 47 and 48, respectively. The slots 47 and 48 are parallel to the path of movement of the piston rod 30. They are formed in the side walls 18 and 19 as shown in FIG. 2. More specifically the slots 47 and 48 guide the pillow blocks 43 and 46 as the mechanism reciprocates. The guidance controls lateral movement of the pin 42, and hence, the piston rod 30 at its free end. More will be noted concerning this hereinafter.

Additionally, the pillow blocks 44 and 45 are received within slots 49 and 50 in the yoke members 16 and 17. The yoke members 16 and 17 are slotted along their central axis, as best shown in FIG. 1. The slots are of sufficient width to just receive the sliding pillow blocks 44 and 45. The pillow blocks are snugly received within the slots 49 and 50 so as to provide lateral contact in converting the axial thrust of the piston rod to rotative motion of the yoke members for the purpose of opening or closing the valve 10.

As shown in FIG. 2, the pillow blocks 43 and 46 preferably include a protruding shoulder somewhat wider than the slots 47 and 48 to keep the pillow blocks in the desired relationship to the slots. They cannot fall out, and cannot pass through slots, and hence, they are trapped or captured to maintain the necessary working relationship best shown in the drawings.

Additionally, the pillow blocks 44 and 45 are preferably captured within the slots in the yoke members 16 and 17. While many techniques might be arranged to keep the various pillow blocks in the necessary position, it is, nevertheless, noted that FIG. 2 shows the dimensions being such that the pillow blocks 44 and 45 are unable to slide along the length of the pin 42 to escape the slots in the yoke members 16 and 17. This keeps the pillow blocks in the slots to continue the working relationship desired for the equipment.

Alternative means might include snap rings mounted in slots on the pin 42 or spacer sleeves between the pillow blocks and piston rod.

Operation of the present invention will now be described, with particular emphasis on the improved features which make the valve operator of the present invention particularly attractive. Of course, the valve operator 12 is installed with respect to a particular valve 10, and the appropriate hydraulic connections are completed to operate the equipment. As hydraulic pressure is introduced to one face of the piston, it is driven along the length of the cylinder and the piston rod 30 is pushed with it. As the piston rod 30 slides, it will be noted that it slides through the seal member 31, all without expensive journals or extremely wide bearing services, and the like. The movement of the piston rod 30 carries the pin 42 with it. The lengthwise movement of the piston rod is converted into rotational movement of the pin 15 and hence the stem of the valve. The interconnection of the pin 42 with the yoke members 16 and 17 is significant. The yoke members 16 and 17 rotate jointly with the pin 15 and the tubular coupling 13 which interconnects to the valve stem 11. The nature of this motion should be considered in detail inasmuch as it is one of the significant improvements of the present invention.

The rod 30 carries the pin 42 during its linear movement. The pin 42 supports the pillow blocks 44 and 45 which are received within the slots in the yoke members. The pillow blocks are rotatable about the pin 42. Their relative rotation with respect to the pin is determined by the angle of the yoke members with respect to the piston rod 30. In FIG. 1, the pillow blocks are shown at an angle with respect to the piston rod. As the piston 27 moves downwardly in FIG. 1, the pillow blocks rotate about their axis and will eventually become perpendicular to the piston rod itself. During this rotation, it will be noted that the pillow blocks slide along the slots toward the lower end of the slots as shown in FIG. 1.

An additional significant feature of the present invention is the inclusion of the slots in the side walls 18 and 19. These slots guide the pin 42, and hence the free end of the piston rod 30 in its movement. The cooperation of the sliding pillow blocks 43 and 46 in the slots 47 and 48 as shown in FIG. 2 guides the free end of the piston rod and prevents it from flexing on lateral loading. As will be understood in viewing FIG. 1, the loading on the lower end of the piston rod otherwise includes a lateral component which tends to flex or bend the piston rod. However, the lateral loading component is carried by the side walls 18 and 19 to prevent flexure of the piston rod. The prevention of lateral flexure of the piston rod substantially reduces the cost, complexity and expense of the valve operator of the present invention.

The next feature to be considered of significance to the present invention is the relationship of the pillow blocks received within the various slots of the structure. The four pillow blocks are all equipped with parallel, spaced faces of relatively broad surface areas. The four pillow blocks contact the respective slots in a broad plane of contact, which is to be contrasted with point contact or line contact. The broad surface presented against the slots enables more even distribution of the loading and avoids point stressing as might occur with a rounded surface such as a roller placed in the several slots. This prevents the formation of indentations in the edges of the several slots, and further enhances the lubrication characteristics of the equipment.

From the foregoing, it will be noted that the features incorporated in the valve operator mechanism which is particularly long wearing and durable. A conventional splash or oil spray system is preferably used for purposes of lubrication as mentioned above. The lubricant coats the edges of the several slots and the pillow blocks to provide a film of lubrication to reduce the friction and the tendency to gall or other wise wear. The present invention is particularly improved in the provision of the parallel slots which guide the lower end or free end of the piston rod 30 for the prevention of lateral loading. If lateral flexure of the piston rod 30 is prevented, a substantial savings in cost and complexity can be achieved through the use of smaller bearings, omission of bushings, and other simplifications as will be apparent.

The foregoing is directed to the preferred embodiment of the present invention. It is intended as a representative disclosure, and not as a limitation on the scope of the present invention. For instance, the valve operator 12 may be utilized in any relative posture with respect to the valve desirable. The re-arrangement or relocation of the equipment may be readily accomplished. The entire lower end of the equipment as shown in FIGS. 1 and 2 may be encompassed in a hermetically sealed housing with a lifetime lubrication system, or some other technique used for providing lubrication. This is a matter of choice which can be determined during implementation.

The apparatus may be duplicated by extending the lever arm on both sides of the valve stem to be rotated. A four cylinder arrangement may be further devised in which a pair of cylinders are found in line with one another and share a longer but common piston rod. The apparatus is further adapted for use with gas or fluid pressure mediums as well as hydraulic oil which is the preferred medium. Applications in addition to the opening and closing of valves may suggest themselves.

The scope of the present invention is determined by the claims which are appended hereto.

What is claimed is:

1. A valve operator which comprises:
   a cylinder,
   a piston within said cylinder,
   a piston rod connected to said piston for movement in response to fluid pressure applied to said piston,
   a housing comprised of at least a pair of spaced walls and being rigidly fixed with respect to the cylinder and through which said piston rod moves,
   slot means formed in two of said walls of said housing, said slot means being parallel to one another and to the path of movement of said piston rod and having a length at least equal to the desired stroke of said piston,
   a coupling member adapted to be connected to a valve stem,
   a wrist pin mounted for rotation about its axis and joined to said coupling member,
   a projecting yoke member joined to said wrist pin, said yoke member having a slot therein,
   a pillow block slidably received in said slot, and
   a connective pin joined to the free end of said piston rod and to said pillow block, said pin moving linerally with said piston rod while causing said yoke member to rotate said wrist pin and coupling member.

2. A valve operator according to claim 1 wherein a pair of pillow blocks are slidingly received within said slot means and are connected to said connective pin.

3. A valve operator according to claim 1 wherein a pair of projecting yoke members are joined to said wrist pin, each having a slot therein and a pillow block received in said slots and positioned on opposite sides of said piston rod from one another.

* * * * *